Aug. 22, 1967  H. BRACK  3,336,719
JOINT LOCKING MEANS
Filed May 24, 1965
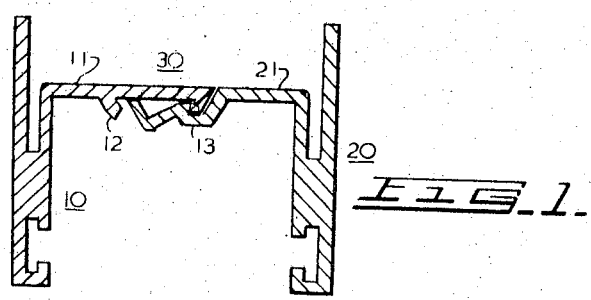
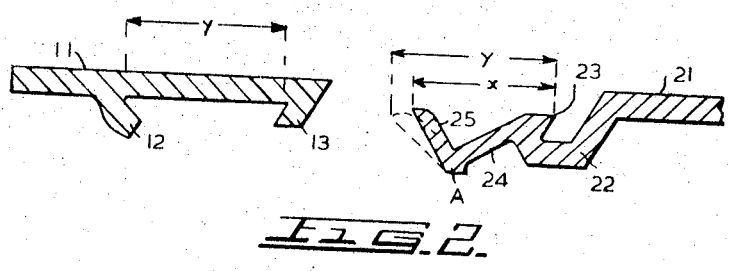
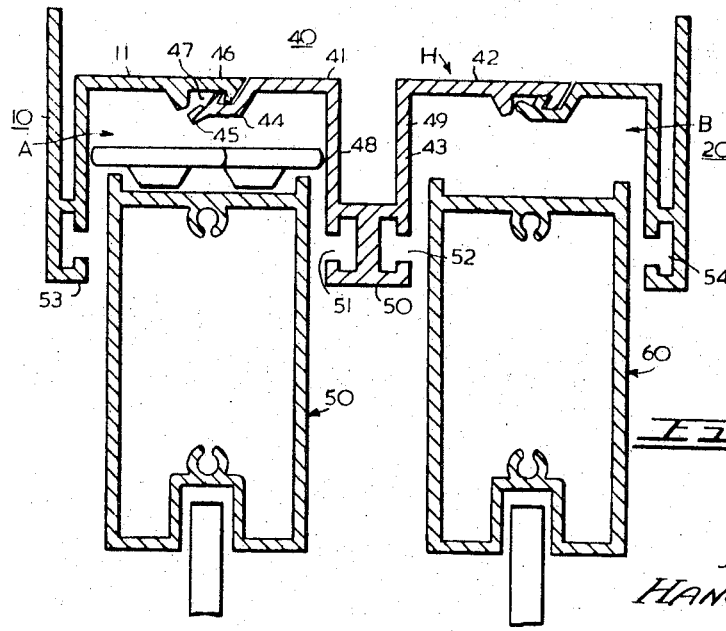
INVENTOR
HANS BRACK

United States Patent Office 3,336,719
Patented Aug. 22, 1967

3,336,719
JOINT LOCKING MEANS
Hans Brack, London, Ontario, Canada, assignor to Pittsburgh Plate Glass Company, Pittsburgh, Pa.
Filed May 24, 1965, Ser. No. 458,226
Claims priority, application Canada, Aug. 28, 1964, 910,511
4 Claims. (Cl. 52—732)

This invention relates to the method of joining together solid metal sections without the use of exterior fasteners. More specifically the invention is concerned with the means of joining together extruded aluminum solid members by upsetting a portion of one member to fit into a selected shaped portion of an adjacent member to which it is to be attached.

There are numerous known ways of joining together aluminum sections. These aluminum sections are commonly used in forming curtain wall structures of the type used in store fronts or in partitions or the like. In most known joints there are utilized additional components and obviously this is undesirable. Undesirable both from the view of appearance and the time consuming task of assembling the same.

It is also known to join together metal members by cold working the same. This is commonly used in the sheet metal industry where conduits are joined together. Such joints may consist of folding over portions of adjacent pieces of metal and thereby join together a pair of members. It also has been proposed to poin together metal members by having a flange of one member project between a pair of flanges on an adjacent member and thereafter relatively move one of the flanges with respect to the other so as to clamp the flange of the first member between them. In this type of joint it is difficult to get a tight fit due to the fact metal attempts to return to the shape from which it was deformed. Furthermore, in this type of joint the entire stress is transferred from one member to the other through the joint effected by upsetting the metal.

It is a principal object of the present invention to provide a method whereby a pair of extruded aluminum members may be joined together without the use of additional components.

It is a further object to join together a pair of extruded aluminum members by upsetting a portion of one member so as to fit into a preformed selected portion of an adjacent member.

It is a further object of the present invention to provide a joint between adjacent members wherein tension stress is transferred from one member to the other through material which has been unaltered through cold working in assembly of the joint.

It is a further object of the present invention to provide extruded aluminum solid sections which may be used for door frames, window frames, or the like and wherein such frames consist of repeating sections such that they may be used in various combinations dependent upon the circumstances.

The invention is illustrated by way of example of the accompanying drawings wherein:

FIGURE 1 is a partial cross sectional view illustrating a pair of solid metallic metal members joined together in accordance with the present invention but shown just prior to upsetting of the metal;

FIGURE 2 is an exploded partial cross sectional view showing in detail the shape of the marginal edges of adjacent members which are to be joined together; and FIGURE 3 is a cross sectional view illustrating a door header consisting of multiple sections joined together in accordance with the present invention one joint being illustrated prior to upsetting the metal or locking tab and the other joint being illustrated in a final assembled form, the drawing further including the upper rail of a pair of horizontal sliding doors.

Referring now to the drawing, shown in FIGURE 1 is a pair of solid extruded aluminum members 10 and 20 joined together by a joint 30. The members 10 and 20, in an assembled form, could be that of door guide, window guide, or the like. The actual use of the assembled members is relatively unimportant with respect to the first aspect of the invention. In order to avoid going into unnecessary detail of the particular shape of the members 10 and 20 at this point, they will be discussed with reference to FIGURE 3 directed to a second aspect of the invention.

The members 10 and 20 respectively have a flange 11 and 21 projecting therefrom, each in a direction toward the other member. The flange 11 has a pair of spaced flanges 12 and 13 projecting from one face thereof. The flanges 12 and 13 are disposed at an angle with respect to the flange portion 11 and are converging inwardly in a direction away from the flange 11. The flanges 12 and 13 further are spaced apart a selected distance and they may be interrupted along the length of member 10 or alternatively be continuous to define a groove or channel substantially dovetailed in cross section. The flange 13 preferably is disposed at the marginal edge of flange 11, however this need not be so. It is necessary for this to be so only if the outer face of flanges 11 and 21 are to be substantially coplanar although again this would not necessarily be so as the flange 21 could readily be modified by having an offset portion and thereby receive an overhanging or projecting portion of the adjacent member.

The flange 21 terminates at the marginal edge thereof in a portion which is substantially the shape in cross section of the letter W. The flange 21 (see FIG. 2) terminates at its marginal edge in a first portion 22 which is substantially U-shaped in section and is of such configuration as to receive the flange 13. The portion 22 terminates at an upper edge 23, which from FIGURE 1 will be noted, abuts against the lower surface of the flange 11. Projecting from the portion 22 is a further portion 24 which is directed angularly downward with respect to the flange 21 and terminates in a tab portion 25 directed upwardly. The portions 24 and 25 together are substantially V-shaped in cross section and in FIGURE 2 it will be noted that they are substantially the same length. At this point attention may be directed to FIGURE 3 in the left hand portion which illustrates a modified form wherein the tab 25 is joined directly to the portion 22 without an intervening portion comparable to 24. To facilitate locking together the members in the modified form, the tab is joined by a weakened section to the main member.

As previously noted, the flanges 12 and 13 on member 11 are spaced apart a selected distance and this distance is such that the opening to the passageway defined by the flanges is somewhat greater than the distance indicated at X in the right hand portion of FIGURE 2. By virtue of this dimensioning, the flange 13 may be readily inserted into the U-shaped portion 22 without interference between the projecting tab 25 and the flange 12. In order to effect joining the members 10 and 20, the apex A joining flanges 24 and 25 may be struck a blow with a hammer, pressed or passed through a pair of rolls or the like so as to spread the flange portions 24 and 25. By this spreading, the tab 25 is moved in a direction away from the edge 23 to fit under the flange 12. The distance X increases to a distance Y which is substantially the same as the distance Y illustrated in the left hand portion of FIGURE 2. In other words, the flange portion 24 and tab 25 are deformed such as to become locked between the flanges 12 and 13 of member 11. Effectively the flange 12 provides a lock for the tab 25 and a tight joint is formed. The reason for the previously described sloping of flange 12 toward flange 13 will now be readily apparent.

In a joint constructed as described any attempt to separate the members 10 and 20 by moving one directly outward from the other has the tensile forces transferred from one to the other through portions of the members which have been unaltered during joining them together. Since this is the most common type of force tending to separate the members 10 and 20, the joint is relatively strong compared to prior art devices wherein the forces are transferred through altered portions of metal.

Referring now to FIGURE 3, there is shown a further aspect of the invention and also an alternative of the first invention. In this drawing, extruded sectional members 10 and 20 are identical to those shown in FIGURE 1. These members, however, are not directly joined together as in the case shown in FIGURE 1 but instead interposed between them is an intermediate member 40. The assembly consisting of members 10, 20 and 40 defines a door header for use with a pair of horizontally sliding doors 50 and 60.

The member 40 is an extruded solid aluminum section and includes a pair of outwardly directed flange portions 41 and 42 interconnected by a central portion 43. The flange 41 terminates in a marginal edge portion somewhat similar to that associated with flange 21 in FIGURE 1, and the flange 42 terminates in a marginal portion corresponding in shape to that of flange 11 in FIGURE 1. Specifically, the flange 41 terminates in a U-shaped marginal edge portion 44 having a tab 45 projecting therefrom. In this modified form of joint there is absent the flange portion 24 which is illustrated in FIGURE 2. The tab 45 is joined directly to the portion 44 by a portion 46 of reduced section. This reduced section, formed by a groove 47, is of such configuration that when the tab 45 is upset to lock together the flanges 11 and 41, the groove becomes substantially closed.

The joints illustrated with respect to flanges 11 and 41 in FIGURE 3 are shown with the tab prior to being upset while the joint shown with respect to flanges 42 and 21 is subsequent to the upsetting of the tab. In other words, in the left hand portion of the drawing, the members have been assembled but not locked as is the case in the right hand portion. This locking may be readily effected by striking the tab 45 a blow with a hammer so as to deform it or the members, subsequent to assembly may be run through a suitable roll type press. As previously indicated, the tab 45 and flange 12 may be continuous or interrupted or various alternatives and variations thereof may be used. It is only necessary that the flange 12 and tab 45 be in positions adjacent one another whereby the tab may be locked by the flange 12.

The modified joint illustrated in FIGURE 3 has a few inherent disadvantages which are:
(1) the tolerance must be much closer than required with respect to the first embodiment;
(2) the action of the tab 45 to snap behind the flange 12 to effect locking of the joint required cold working or movement of the flange 12 and this reduces the strength of the joint; and
(3) the tab 45 requires somewhat more movement than in the case of the other embodiment, and accordingly, the required additional cold working reduces the strength and thus the efficiency of the joint.

The portion 43 of the member 40 consists of a pair of parallel flanges 48 and 49 interconnected by a web 50 having a pair of oppositely disposed grooves 51 and 52 in opposite faces thereof. These grooves 51 and 52 are directed respectively toward similarly shaped grooves 53 and 54 in respective members 10 and 20. The grooves 51, 52, 53 and 54 provide a means whereby a weather seal of felt, neoprene, or the like may be retained to be in sliding contact with the upper rail of the respective doors 50 and 60.

From the second aspect of the invention, it will be seen there is provided a door header consisting of a plurality of sections joined together; the two exterior portions being similar, i.e., members 10 and 20, with an insert therebetween of a member 40. There may be additional members 40 or variations thereof inserted so as to provide any desirable number of channels for receiving the upper rail of the horizontally sliding doors as shown. In FIGURE 3 the members 10 and 40 define a first channel A to receive the upper rail of door 50 while the members 20 and 40 define a second channel B to receive the upper rail of door 60.

From the foregoing it will be seen there are two aspects to the present invention, one being the manner of joining together a pair of extruded aluminum sections and the second concerned with providing repeating sections for the formation of a door header. With respect to this latter aspect, the similarly shaped sections may be utilized for window frames wherein the sash may be of either the vertical or horizontal sliding type.

I claim:
1. A two-piece structural assembly comprising:
 (a) a generally planar first main flange member, the latter having first and second flanges projecting outwardly therefrom at acute angles with respect thereto, said first and second flanges converging towards each other to define a dovetail-in-section shaped groove, the first one of said flanges disposed adjacent an edge of the first main flange member, and the second one of said flanges spaced inwardly therefrom;
 (b) a generally planar second main flange member substantially coplanar with said first main flange member and having a marginal edge in abutting relation with the said edge of the first main flange member, said second main flange member having a first portion generally U-shaped in cross section connected to said marginal edge thereof to define a recess within which is snugly received said first one of said flanges of the first main flange member, and a tab portion connected to said first U-shaped portion and extending generally away from the latter and toward the plane of the first and second main flange members, with a portion of said tab underlying the second one of said flanges of said first main flange member; whereby said first and second main flange members are securely locked together.

2. A two-piece structural assembly comprising:
 (a) a generally planar first main flange member, the latter having first and second flanges projecting outwardly therefrom at acute angles with respect thereto, said first and second flanges converging towards each other to define a dovetail-in-section shaped groove, the first one of said flanges disposed adjacent an edge of the first main flange member, and the second one of said flanges spaced inwardly therefrom;
 (b) a generally planar second main flange member substantially coplanar with said first main flange member and having a marginal edge in abutting relation with the said edge of the first main flange member, said second main flange member having a first portion generally U-shaped in cross section connected to said marginal edge thereof to define a recess within which is snugly received said first one of said flanges of the first main flange member, and a second portion generally V-shaped in cross section connected to said first portion with the apex of said V projecting away from the plane of the first and second main flange members such that said first and second portions together define a generally W-shaped-in-cross section portion, that part of said V-shaped portion remote from the U-shaped first portion defining a tab with a portion of said tab underlying the second one of said flanges of said first main flange member;

whereby said first and second main flange members are securely locked together.

3. A multi-part structural member assembled to provide a plurality of longitudinal grooves comprising a first and second member disposed in spaced relationship, each being substantially L-shape in cross section and including a body portion and a flange projecting therefrom, the flange of one member projecting in a direction toward the other member and each terminating in a joint forming portion and a third member interposed between said flanges, said third member being substantially T-shaped in cross section and having a central stem and a pair of flange portions directed respectfully in opposite directions outwardly therefrom, said latter flange portions each having joint forming portions thereon co-operating with the portions on adjacent flanges of said first and second members rigidly to join together said members, the joint-forming portions including a tab on one of the members upsettable subsequent to assembly of the components to engage the other member and thereby interlock said members, the stem of said third member, and bodies of the respective ones of said first and second members projecting in a common direction to define a pair of spaced parallel grooves.

4. A multi-part structural member assembled to provide a plurality of longitudinal grooves comprising a first and second member disposed in spaced relationship, each being substantially L-shape in cross section and including a body portion and a flange projecting therefrom, the flange of one member projecting in a direction toward the other member and each terminating in a joint-forming portion, and a third member interposed between said first and second members, said third member being substantially T-shape in cross section and having a central stem and a pair of flange portions directed respectively in opposite directions outwardly therefrom to overlap respective ones of the projecting flanges on said first and second members, the flange portions on said third member each having joint-forming portions thereon cooperating with portions on adjacent flanges of said first and second members rigidly to join together said members, the stem of said third member and the body of respective ones of the first and second members projecting in a common direction to provide a pair of spaced, parallel grooves, each of said grooves including further grooves substantially T-shape in cross section in opposed faces thereof.

References Cited

UNITED STATES PATENTS

| | | | |
|---|---|---|---|
| 2,180,504 | 11/1939 | Bradfield et al. | 52—588 |
| 2,885,039 | 5/1959 | MacFarland | 52—582 |
| 3,111,203 | 11/1963 | DeRidder | 52—588 |
| 3,145,433 | 8/1964 | Jones | 49—414 |

DAVID J. WILLIAMOWSKY, *Primary Examiner.*

KENNETH DOWNEY, REINALDO P. MACHADO, *Examiners.*